(12) United States Patent
Dal Pra'

(10) Patent No.: US 6,792,826 B2
(45) Date of Patent: Sep. 21, 2004

(54) COMBINED GEAR CHANGE AND BRAKE CONTROL UNIT FOR A BICYCLE

(75) Inventor: Giuseppe Dal Pra', Vicenza (IT)

(73) Assignee: Campagnolo S.r.l., Vincenza (IT)

( * ) Notice: Subject to any disclaimer, the term of this patent is extended or adjusted under 35 U.S.C. 154(b) by 0 days.

(21) Appl. No.: 10/041,569

(22) Filed: Jan. 10, 2002

(65) Prior Publication Data

US 2002/0124679 A1 Sep. 12, 2002

(30) Foreign Application Priority Data

Jan. 11, 2001 (IT) ..................................... TD2001A0011

(51) Int. Cl.[7] ................................................ F16C 1/10
(52) U.S. Cl. ......................... 74/502.2; 74/475; 74/489; 192/217
(58) Field of Search .............................. 74/502.2, 489, 74/535, 475, 502.4, 527, 531; 192/217, 4 R

(56) References Cited

U.S. PATENT DOCUMENTS

| | | | |
|---|---|---|---|
| 4,876,913 A | * 10/1989 | Romano | ...................... 74/535 |
| 5,012,692 A | * 5/1991 | Nagano | ........................ 74/475 |
| 5,257,683 A | * 11/1993 | Romano | ...................... 192/4 R |
| 5,479,776 A | * 1/1996 | Romano | ..................... 74/502.2 |
| 5,791,195 A | * 8/1998 | Campagnolo | ............. 74/473.14 |
| 2002/0104401 A1 | * 8/2002 | Dal Pra | ..................... 74/502.2 |

FOREIGN PATENT DOCUMENTS

| | | | |
|---|---|---|---|
| DE | 199 13 951 A1 | * 12/1999 | ................ 74/502.2 |
| EP | 0504118 | 9/1992 | |

* cited by examiner

Primary Examiner—Vinh T. Luong
(74) Attorney, Agent, or Firm—Volpe and Koenig, P.C.

(57) ABSTRACT

A combined gear change and brake control unit in a support body which can be fastened to a bicycle handlebar. The brake control lever and gear change control unit are carried by a support body. The gear change unit has a rotatable shaft attached to a pulley with an end portion of a derailler control cable wound thereon. The shaft is subject to a return torque that turns the shaft to release the cable. The unit has a gear change lever that controls the rotation of the shaft in a direction that winds the cable onto the pulley and a cable release button. The gear change control unit includes a ratchet mechanism that leaves the shaft free to turn by a predetermined amount in the release direction of the cable.

20 Claims, 5 Drawing Sheets

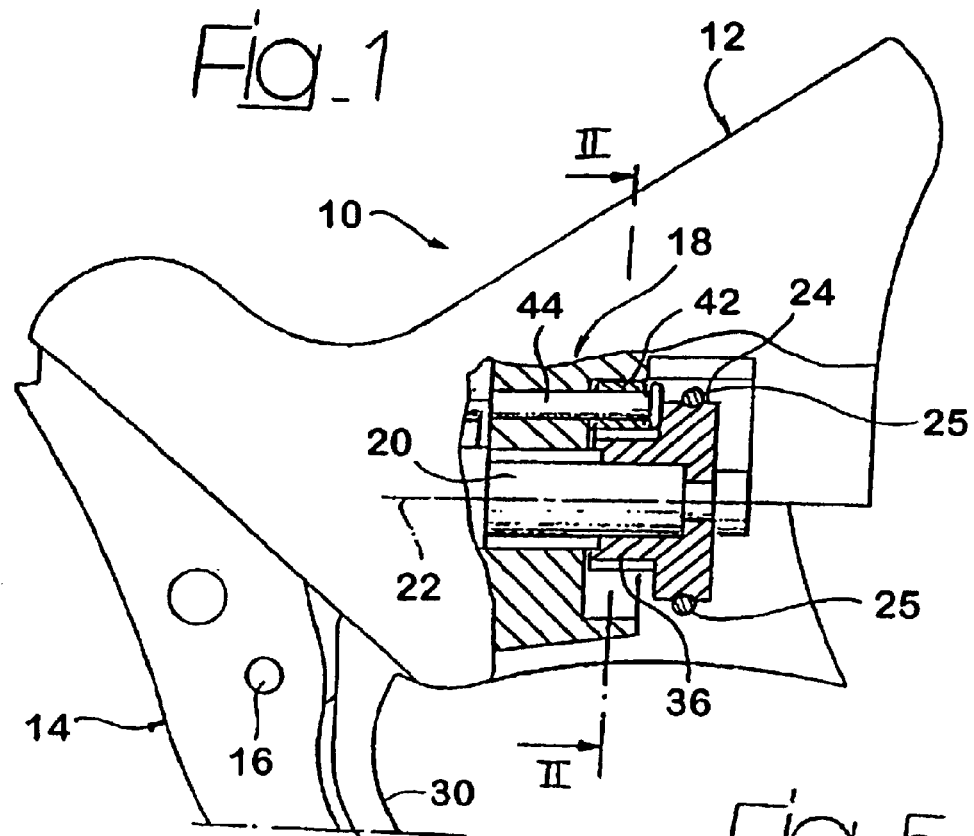
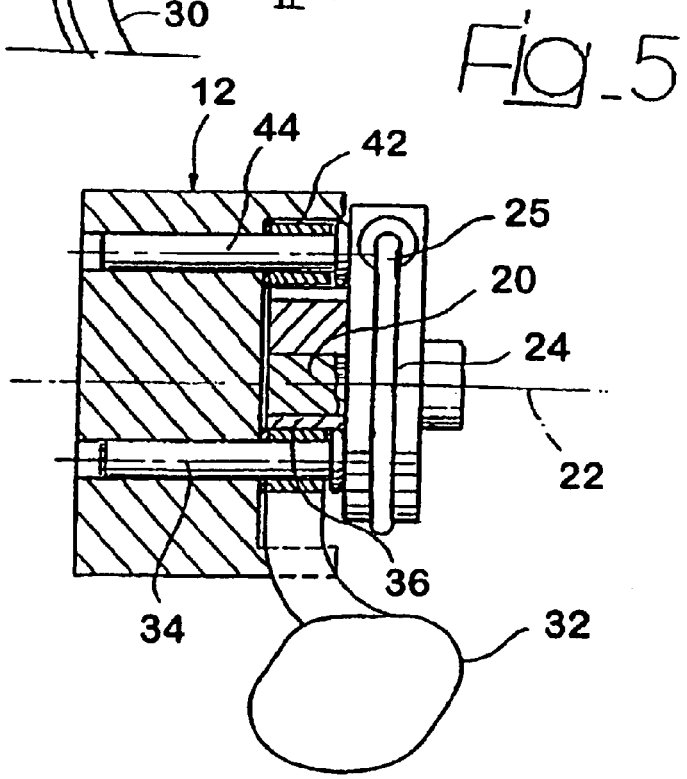

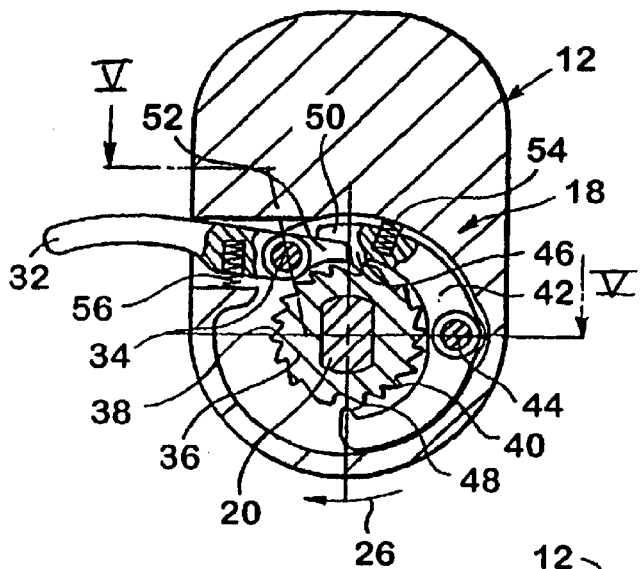
Fig_2a
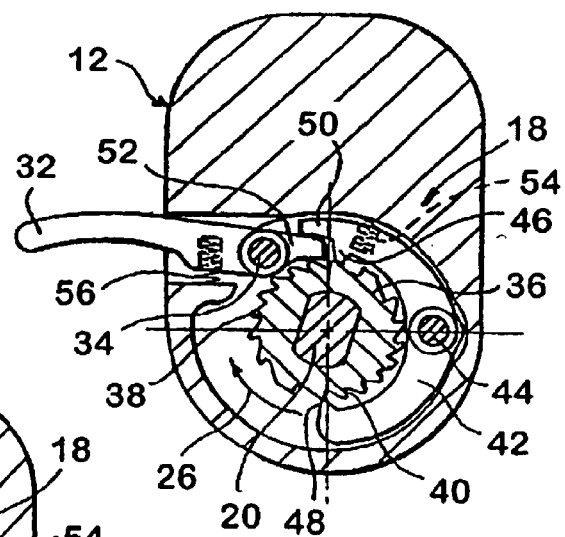
Fig_3a
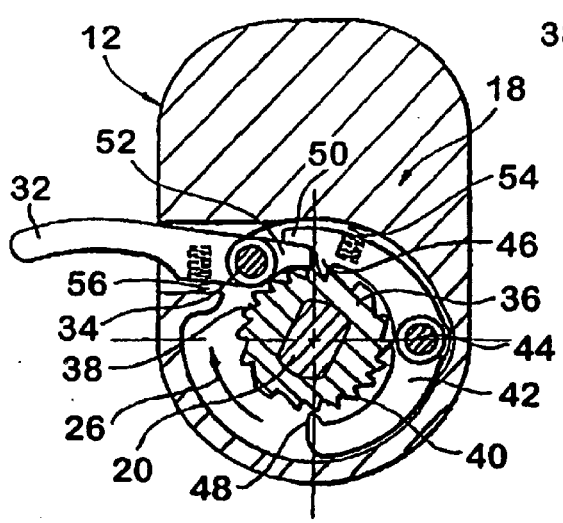
Fig_4a

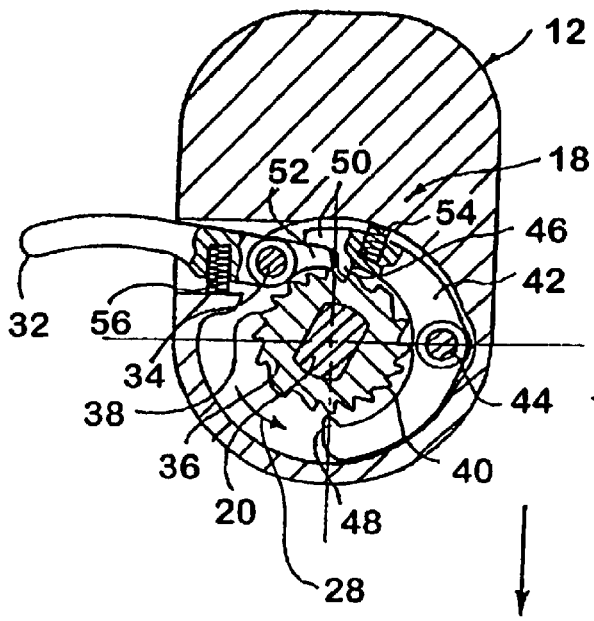
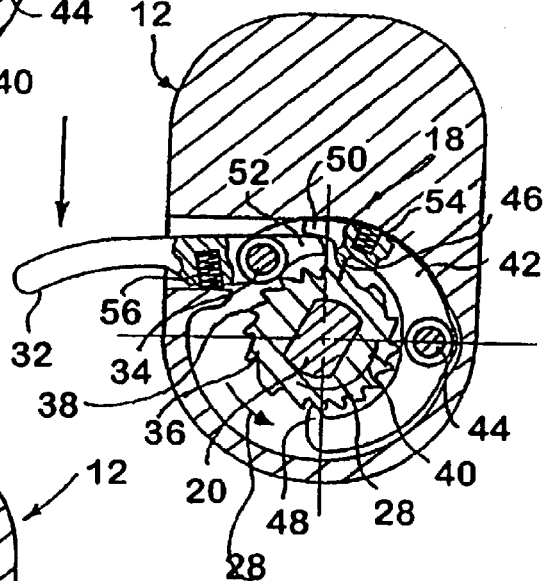
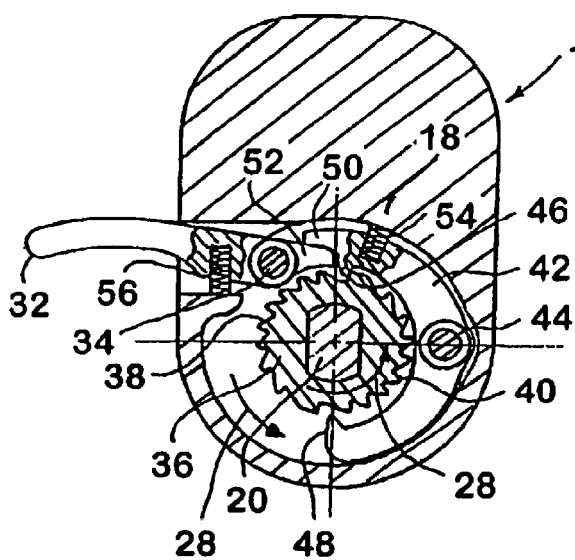

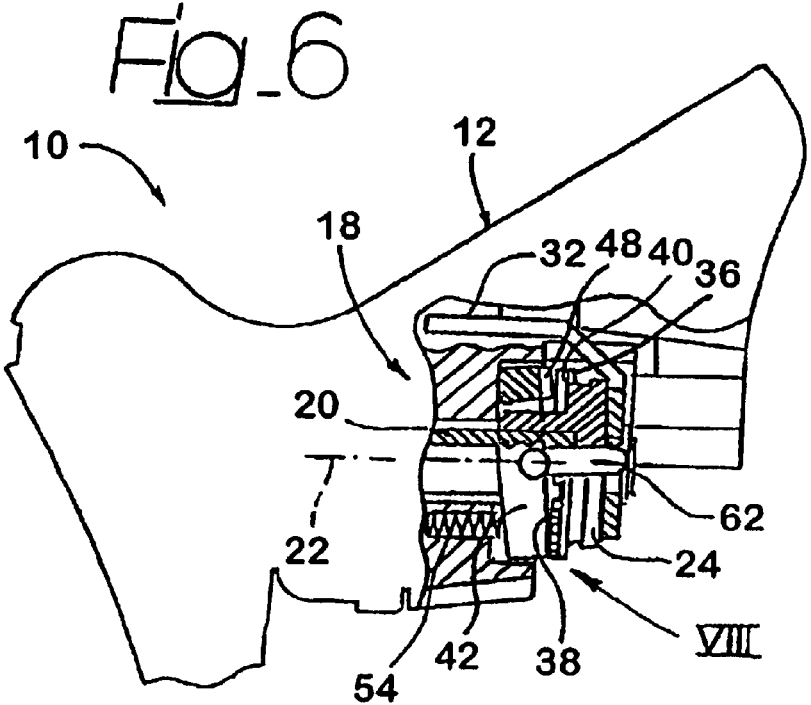
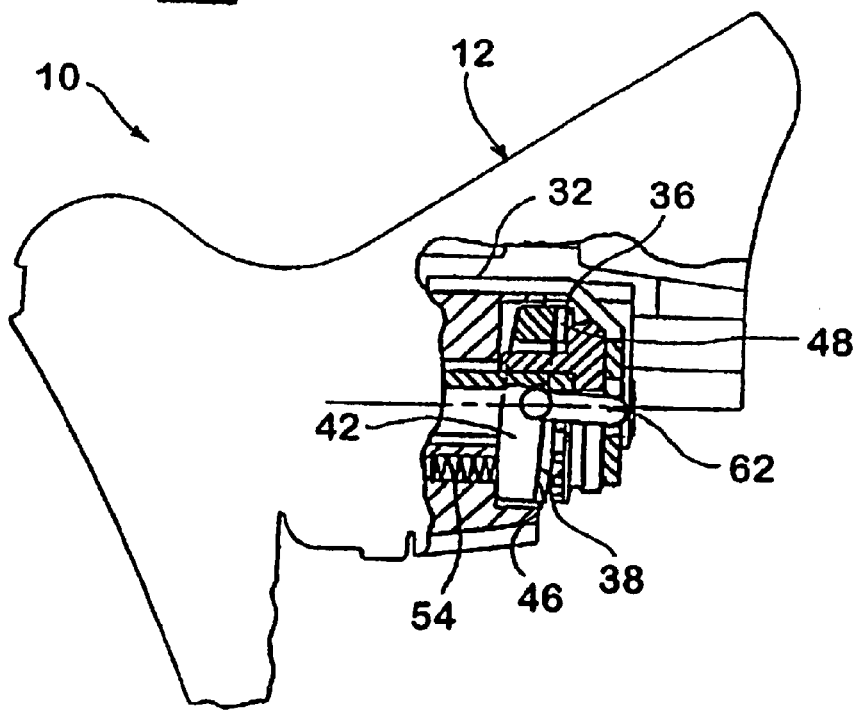

COMBINED GEAR CHANGE AND BRAKE CONTROL UNIT FOR A BICYCLE

BACKGROUND OF THE INVENTION

This invention relates to a combined gear change and brake control unit for a bicycle. More precisely, this invention relates to a combined unit of the type described by the Applicant in document EP 0 504 118. This document describes a combined control unit comprising a support body connected to a brake control lever pivoting around a first axis and a gear change control unit connected to the support body. The gear change control unit comprises a shaft turnable around a second axis orthogonal to said first axis and carrying a pulley on which the end portion of a control cable of a front or rear derailleur of a bicycle is wound. The rotation of the shaft in a first direction can be controlled by means of a gear change lever, which is arranged immediately behind the brake control lever, while the rotation of the shaft in a second direction can be controlled by means of a button lever, operating on a gear, which is solidly fastened to the shaft. As concerns the shaft control in said second direction, the control unit of the known kind consists of a spring retainer mechanism to withhold the shaft in a number of reference positions. The button lever is destined to co-operate with the gear solidly fastened to the shaft by means of a meshing unit, to produce the rotation of the shaft from one of said reference positions to another.

SUMMARY OF THE INVENTION

The objective of this invention is to provide a gear change control unit which is constructively more simple and cost-effective than the one described above. An additional objective of this invention is to provide a gear change control unit requiring a very limited stroke of the button lever to shift the gear.

According to this invention, these objectives are attained by means of a combined control unit which characteristics are described in the main claim.

BRIEF DESCRIPTION OF THE DRAWINGS

This invention will be better explained by the following detailed descriptions with reference to the accompanying figure as non-limiting example, whereas:

FIG. 1 is a lateral partially sectioned view of a combined control unit according to this invention, FIGS. 2a, 3a and 4a are sections according to the line II—II in FIG. 1 illustrating the operation of a unit during gear change in a first direction, FIGS. 2b, 3b, 4b are similar sections to those shown in FIGS. 2a, 3a and 4a illustrating the operation of the unit during the gear change in a second direction as indicated by the directional arrows, FIG. 5 is a section according to the line V—V in FIG. 2a, FIG. 6 is a lateral partially sectioned view of a second form of embodiment of the unit according to this invention, FIG. 7 is a similar view to FIG. 6 illustrating a second operative position.

DETAILED DESCRIPTION OF THE INVENTION

Figure 8:
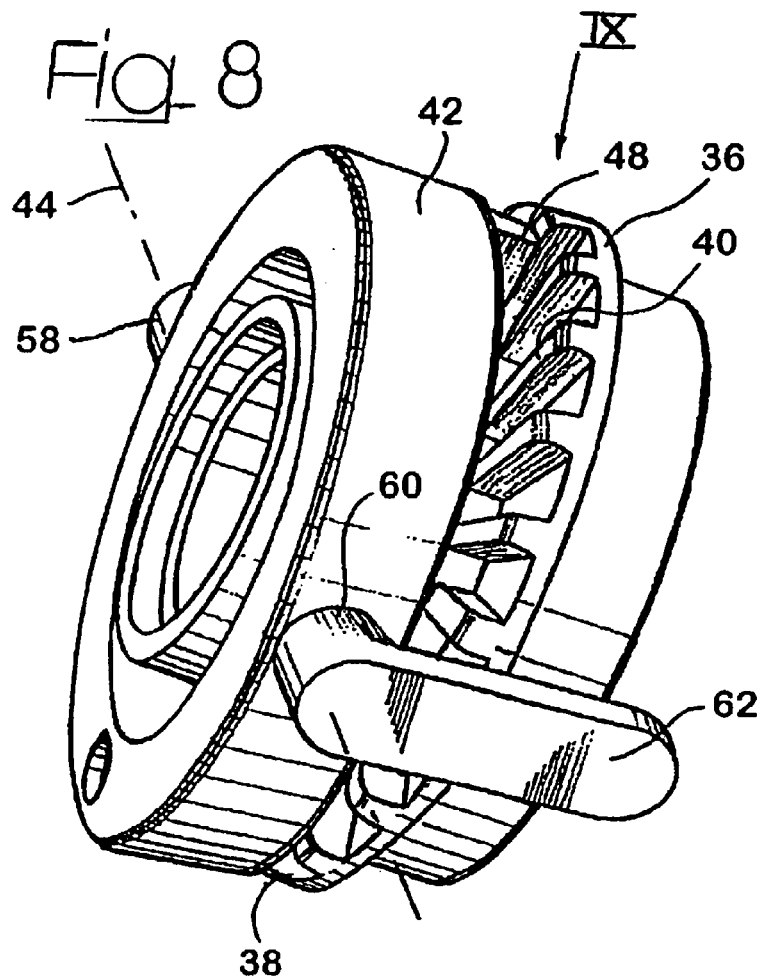
FIG. 8 is a perspective view of the part indicated by arrow VIII in FIG. 6.

With reference to FIG. 1, numeral 10 indicates a combined gear change and brake control unit of a competition bicycle. Unit 10 essentially works as the unit described in the previous patent application EP 0 504 118 by the Applicant to which reference is made for all aspects not expressly illustrated in this description.

The integrated control unit 10 comprises a support body 12 with means (not illustrated) for fastening to the handlebar of a bicycle (also not illustrated). A brake control lever 14 is pivotally fastened to the support body 12 around a first axis formed by a pivot 16. In the known way, an end of a brake control cable is anchored to an upper end of the lever 14.

The support body 12 carries a gear change control unit, generally referred to with numeral 18, comprising a shaft 20 connected to the support body 12. The shaft 20 turns around a second axis, either orthogonal, or essentially orthogonal, to the pivoting axis 16 of the brake control lever 14. The shaft 20 carries a pulley 24 on which an end portion of a control cable 25 of a front or rear derailleur of a bicycle is wound. The rotation of the shaft 20 in a first direction, indicated by arrow 26 in FIGS. 2a, 3a and 4a additionally winds the derailleur control cable on the pulley 24, while a rotation of the shaft 20 in a second direction, indicated by the arrows 28 in the FIGS. 2b, 3b and 4b, releases the control cable of the derailleur.

For correct understanding of this invention, it is important to observe that the shaft 20 is constantly subjected to torque, which tends to turn it in the release direction of the derailleur control cable (in the direction indicated by the arrows 28). In the form of embodiment illustrated in the drawings, the torque which tends to turn the shaft 20 in the release direction of the cable is produced by the derailleur control cable, which is subjected to the action of an elastic element arranged in the derailleur.

With reference to FIG. 1, the gear change unit 18 comprises a gear change lever 30 arranged immediately behind the control lever of the brake 14. The gear change lever 30 is associated to a mechanism for controlling the rotation of the shaft 20 in said first direction 26. This mechanism can be made as described in detail in document EP 0 540 118, or alternatively as described in a contemporaneous patent application by the same Applicant with the same title.

With reference to the FIGS. from 2 to 5, the unit 10 comprises a button lever 32, associated to a mechanism for controlling the rotation of a shaft 20 in said second direction 28. With reference to FIGS. from 2 to 5, the button lever 32 is arranged on a side of the support body and is pivotally mounted on the support body by means of a pivot 34, which axis is either parallel, or substantially parallel, to the rotation axis 22 of the shaft 20. The gear 36 is solidly fastened to the shaft 20. The gear 36 is equipped with a first set of teeth 38 and a second set of teeth 40. The gear change control unit 18 comprises a rocker arm 42 pivoting on the support body 12 by means of pivot 44. The rocker arm 42 comprises a first meshing unit 46, which meshes the teeth of the first set, and a second meshing unit 48, which meshes the teeth of the second set. The rocker arm 42 is made so that when the first meshing unit 46 meshes the teeth 38, the second meshing unit 48 is released from the teeth 40 and, conversely, when the second meshing unit 48 engages the teeth 40, the first meshing unit 46 is released from the teeth 38.

The rocker arm 42 has an appendix 50, which co-operates by resting on a corresponding appendix 52 of the button lever 32, so that an anticlockwise oscillation of the lever 32 around the pivot 34 generates a clockwise oscillation of the rocker arm 42 around the pivot 44. The rocker arm 42 and the button lever 32 co-operate with the respective elastic elements 54, 56, consisting of, for example, small compressed coil springs, arranged between the support body 12 and the respective housings formed in the rocker arm 42 and in the button lever 32. The spring 54 associated with the rocker arm 42 will tend to make the rocker arm 42 turn anticlockwise and, consequently, tend to keep the rocker arm 42 in a position in which the first meshing unit 46 meshes the teeth 38. The spring 56 associated with the button lever 32 tends to turn the button lever 32 in the clockwise direction, that is in the direction corresponding to a respective distancing between the appendixes 52 and 50. The spring 56 pushes the button lever 36 towards an end of stroke stop defined by a part of the support body 12.

The teeth 38 and the corresponding meshing unit 46 are shaped so that when the first meshing unit 46 meshes the teeth 38 of the first set (FIGS. 2a and 2b), the gear 36 (and, consequently, the shaft 20) is free to turn in the direction shown by the arrow 26 in FIG. 2 (direction of most winding of the derailleur control cable on the pulley 24), while the meshing unit 46 prevents the rotation of the gear 36 in the opposite direction (release direction of the cable), indicated by the arrows 28 in the FIGS. 3b and 4b. When the second meshing unit 48 engages the teeth 40 of the second set (FIG. 3b) it prevents the rotation of the gear 36 in the direction indicated by the arrows 28 (release direction of the cable).

In the form of embodiment illustrated in the FIGS. from 1 to 5, the teeth 38, 40 have saw-tooth profiles, which together form ratchet mechanisms with the corresponding meshing units 46, 48, engaging in the direction 28 of cable release.

In the home condition, the unit is in the configuration shown in FIG. 2a. In this configuration, the derailleur control cable applies a torque to the shaft 20, which tends to turn it anticlockwise. The ratchet mechanism formed by the the first meshing unit 46 and the teeth 38 prevents the rotation of the gear 36 and the shaft 20 in the anticlockwise direction. The sequence shown in FIGS. 2a, 3a and 4a illustrates the condition in which a single gear is shifted in the direction of increased winding of the derailleur control cable on the pulley 24. The gear is shifted by oscillating the gear change lever indicated with numeral 30 in FIG. 1. This oscillation of the lever controls the clockwise rotation of the shaft 20 with reference to FIGS. 2a, 3a and 4a. The ratchet mechanism formed by the first meshing unit 46 and the teeth 38 of the first set does not obstruct the clockwise rotation of the shaft 30. This ratchet mechanism forms an indexing unit which signals the passage from one gear to the following gear by clicking. The user clearly hears when the mechanism shifts, because the first meshing unit 46 clips onto a subsequent tooth 38.

The operative sequence shown in FIGS. 2b, 3b and 4b illustrates the condition in which the gear is shifted by operating the button lever 32. The configuration in FIG. 2b shows a home position, which is identical to the position of FIG. 4a. Starting from the configuration in FIG. 2b, the user presses the button lever 32 downwards and controls the oscillation around the pivot 44 of the rocker arm 42. As soon as the first meshing unit 46 is released from the tooth 30, the gear 36 is simultaneously free to turn under the action of the return torque generated by the derailleur control cable. The gear 36 consequently oscillates in the direction indicated by the arrow 28 until one of the teeth 40 meets the second meshing unit 48 (FIG. 3b). At this point, the shaft 20 has made a turn, which amplitude is equal to half the rotation needed to shift the gear. When the user releases the button lever 32, the rocker arm 42 oscillates anticlockwise to return to home conditions. By effect of this oscillation, the second meshing unit 48 is released from the tooth, simultaneously releasing the gear 36, which is free to turn anticlockwise under the action of the return torque generated by the derailleur control cable. The oscillation of the gear 36 ends when one of the teeth engages a first meshing unit 46 (FIG. 4b). Consequently, a gear shift control in the release direction of the derailleur control cable requires a downwards thrust of the button lever 32 and a release for the same lever which returns to home position under the return action of the elastic means 56. A first half of the angular oscillation stroke of the shaft needed to shift the gear is made by effect of the downwards thrust of the button lever and the subsequent half of the angular stroke of the shaft is obtained by releasing the button lever.

This description shows that the amplitude of the angular stroke of the button lever 32 is independent with respect to the amplitude of the angular stroke of the shaft required to shift the gear. Advantageously, the button lever 32 can provide a very small angular stroke, so that the user can operate the lever with a light pressure of the thumb, without needing to make a long control stroke with the thumb. FIGS. from 6 to 9 illustrate an alternative form of embodiment of the mechanism described above. The parts corresponding to those described above are indicated with the same numeric references.

Figure 9:
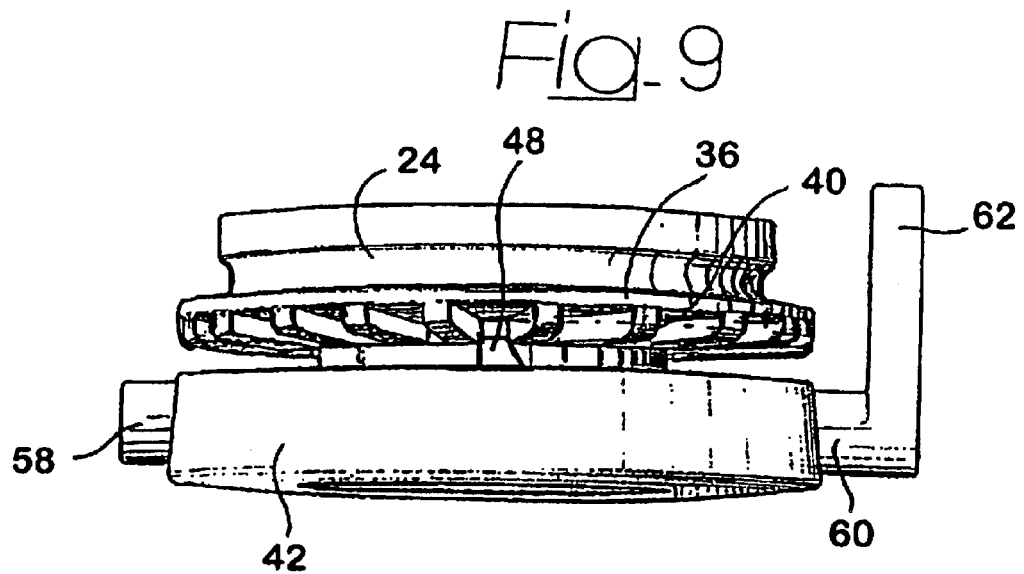
FIG. 9 is a plan view according to the arrow IX in FIG. 8.

With respect to the form of embodiment described above, the variant in FIGS. from 6 to 9, the gear 36 is equipped with front teeth, instead of radial teeth. The frontal teeth of the gear 36 are indicated with numerals 38 and 40. The rocker arm 42 is ring-shaped and equipped with a pair of diagonally opposite appendixes 58, 60 (FIGS. 8 and 9), which define an orthogonal rotation axis with respect to the shaft 20. The appendix 60 has a control arm 62 on which a portion of the button lever 32 (FIGS. 6 and 7) operates to control the oscillation of the rocker arm 42. As shown in FIGS. 6 and 7, the spring 54 which holds the rocker arm 42 in home position acts along a direction of the axis 22 of the shaft 20. The same spring 54 also holds the button lever 32 in home position. FIG. 6 illustrates the home position of the mechanism, while the FIG. 7 illustrates the position assumed by the mechanism following a downwards push of the button lever 32. Similarly to the form of embodiment described above, the rocker arm 42 has a first and a second meshing unit 46, 48 for meshing the respective teeth 38, 40. The meshing units 46, 48 are formed so to allow the free rotation of the gear in one direction and to prevent rotation in the opposite direction, as described above. The operation of the mechanism illustrated in FIGS. from 6 to 9 is substantially identical to that of the unit described above, with the only difference that the ratchet mechanism consists of teeth and meshing units which mesh frontally, instead of radially.

What is claimed is:

1. A combined gear change and brake control unit for a bicycle comprising:

a support body which can be fastened to a bicycle, a brake control lever pivotally mounted on the support body around a first axis, a gear change control unit carried by the support body, comprising a shaft turning around a second axis positioned substantially orthogonally to said first axis, in which the shaft carries a pulley an which an end portion is configured to receive a control cable of a derailleur which is to be wound, and in which said shaft is subject to a return torque tending to turn the shaft towards a direction in which the cable is released, a gear change lever arranged behind the brake control lever for controlling the rotation of said shaft in a direction of increased winding of the cable, and a button lever arranged on a side of said support body for controlling the rotation of said shaft in the release direction of the cable, wherein the gear change control unit comprises a rocker arm controlled by said button lever and subject to assuming a home position and an active position, the rocker arm is arranged to leave the shaft free to turn by a predetermined amount in the release direction of the cable, under the action of said return torque following each variation of position of the rocker arm between the home position and the active position, and vice versa, and said button lever and said rocker arm are two separate components, oscillating independently with respect to the support body, elastic means being provided to urge said button lever towards an end of stroke stop.

2. The unit of claim 1 wherein said rocker arm comprises a gear fastened to the support body with a first and a second meshing unit co-operating with said gear.

3. The unit of claim 2 wherein the first and second meshing unit are arranged to retain the gear in said release direction of the cable.

4. A combined gear change and brake control unit for a bicycle comprising:

a support body which can be fastened to the bicycle;

a brake control lever pivotally mounted on the support body around a first axis;

a gear change control unit carried by the support body, comprising a shaft turning around a second axis, positioned orthogonally to said first axis, in which the shaft carries a pulley on which an end portion of a control cable of a derailleur is destined to be wound, and in which said shaft is subject to a return torque tending to turn the shaft towards a direction in which the cable is released;

a gear change lever arranged behind the brake control lever for controlling the rotation of said shaft in a direction of most winding of the cable; and a button lever arranged on a side of said support body for controlling the rotation of said shaft in the release direction of the cable;

wherein the gear change control unit comprises a rocker arm controlled by said button lever and subject to assuming a home position and an active position, the rocker arm is arranged to leave the shaft free to turn by a predetermined amplitude in the release direction of the cable, under the action of said return torque following each variation of position of the rocker arm between the home position and the active position, and vice versa, and an elastic means urges the rocker arm toward the home position.

5. The unit of claim 4 wherein said rocker arm engages a gear fastened to the support body with a first and a second meshing unit cooperating with said gear.

6. The unit of claim 5 wherein the first and second meshing unit are arranged to retain the gear in said release direction of the cable.

7. A combined gear change and brake control unit for a bicycle comprising:

a support body which can be fastened to the bicycle;

a brake control lever pivotally mounted on the support body around a first axis;

a gear change control unit carried by the support body, comprising a shaft turning around a second axis positioned orthogonally to said first axis, in which the shaft carries a pulley on which an end portion of a control cable of a derailleur is destined to be wound, and in which said shaft is subject to a return torque tending to turn the shaft towards a direction in which the cable is released;

a gear change lever arranged behind the brake control lever for controlling the rotation of said shaft in a direction of most winding of the cable; and a button lever arranged on a side of said support body for controlling the rotation of said shaft in the release direction of the cable;

wherein the gear change control unit comprises a ratchet mechanism controlled by said button lever and subject to assuming a home position and an active position, the ratchet mechanism is arranged to leave the shaft free to turn by a predetermined amplitude in the release direction of the cable, under the action of said return torque following each variation of position of the ratchet mechanism between the home position and the active position, and vice versa, said ratchet mechanism comprising a gear fastened to the shaft and rocker arm pivoting on the support; and said gear is equipped with radial teeth and in that said ratchet mechanism is pivotally mounted around an axis, either parallel or substantially parallel to the rotation axis of said shaft.

8. The unit of claim 7 wherein a first and a second meshing unit co-operate with said gear.

9. The unit of claim 8 wherein the first and second meshing unit are arranged to retain the gear in said release direction of the cable.

10. A combined bicycle gear change and brake control unit comprising:

a support body which can be fastened to the bicycle;

a brake control lever pivotally mounted on the support body around a first axis;

a gear change control unit carried by the support body, comprising a shaft turning around a second axis that is positioned orthogonally to said first axis, the shaft attached to a pulley about which an end portion of a derailleur control cable is destined to be wound, and the shaft is subject to a return torque that turns the shaft towards a first direction;

a gear change lever for controlling the rotation of the shaft in the first direction;

a button lever arranged on a side of the support body for controlling the rotation of the shaft in a second direction;

a rocker arm, controlled by said button lever, having a home position and an active position, the rocker arm is arranged to leave the shaft free to turn by a predetermined amplitude in the second direction, under the action of said return torque following each variation of position of the rocker arm between the home position and the active position, and vice versa; and a means that pushes the rocker arm toward the home position.

11. The unit of claim 10 wherein the first direction is a direction that winds the cable onto the pulley and the second direction unwinds the cable from the pulley.

12. The unit of claim 10 wherein the first direction is a clockwise direction and the second direction is a counterclockwise direction.

13. The unit of claim 10 wherein the first direction is a counterclockwise direction and the second direction is a clockwise direction.

14. A combined gear change and brake control unit for a bicycle comprising:

a support body which can be fastened to the bicycle;

a brake control lever pivotally mounted on the support body around a first axis;

a gear change control unit carried by the support body, comprising a shaft turning around a second axis positioned substantially orthogonally to the first axis, in which the shaft carries a pulley on which an end portion is configured to receive a control cable of a derailleur which is to be wound, and in which the shaft is subject to a return torque tending to turn the shaft towards a direction in which the cable is released;

a gear change lever arranged behind the brake control lever for controlling the rotation of the shaft in a direction of increased winding of the cable; and a button lever arranged on a side of the support body for controlling the rotation of the shaft in the release direction of the cable; wherein the gear change control unit comprises a ratchet mechanism controlled by the button lever and subject to assuming a home position and an active position, the ratchet mechanism is arranged to leave the shaft free to turn by a predetermined amount in the release direction of the cable, under the action of the return torque following each variation of position of the ratchet mechanism between the home position and the active position and vice versa;

wherein said ratchet mechanism comprises a gear fastened to the shaft and a rocker arm pivoting on the support body cooperating with the teeth of said gear.

15. The unit of claim 14 wherein the rocker arm comprises first and second meshing unit engaging the teeth of the gear.

16. The unit of claim 14 wherein the button lever and the rocker arm are two separate components, oscillating independently with respect to the support body, elastic means being provided to push the button lever towards an end of stroke stop.

17. The unit of claim 15 wherein the first and the second meshing unit are arranged so to retain the gear in the release direction of the cable.

18. The unit of claim 14 wherein the ratchet mechanism comprises elastic means arranged to push the rocker arm towards the home position.

19. The unit of claim 14 wherein the gear is equipped with radial teeth and in that the rocker arm is pivotally mounted around an axis, either orthogonal or substantially parallel to the rotation axis of the shaft.

20. A bicycle gear change and brake control unit comprising:

a) a support body which is adapted to be fastened to a bicycle, b) a brake control lever pivotally mounted on the support body around a first axis;

c) a gear change control unit positioned within the support body, the gear change control unit comprising:
   i) a shaft that turns around a second axis that is substantially orthogonal to said first axis,
   ii) a pulley mounted on the shaft and having an end portion configured to receive a gear control cable which has wind up and release directions and said shaft is subject to a return torque tending to turn the shaft towards the direction in which the cable is released, and
   iii) a rocker arm having controlled movement between a home position and an active position so that said shaft is free to turn by a predetermined amount in the release direction of the cable, under the action of said return torque following movement of the rocker arm between the home and the active positions;

d) a gear change lever, that oscillates with respect to the support body, arranged behind the brake control lever for controlling the rotation of said shaft in a direction of increased winding of the cable;

e) a button lever, that is separate from the gear change lever and oscillates independently from the gear change lever with respect to the support body, arranged on a side of said support body for controlling the rotation of said shaft in the release direction of the cable; and, f) means for urging said button lever towards an end stop.

* * * * *

UNITED STATES PATENT AND TRADEMARK OFFICE
CERTIFICATE OF CORRECTION

PATENT NO. : 6,792,826 B2
DATED : September 21, 2004
INVENTOR(S) : Gluseppe Dal Pra'

It is certified that error appears in the above-identified patent and that said Letters Patent is hereby corrected as shown below:

Column 4,
Line 60, after the word "pulley", delete "an" and insert therefor -- on --.

Signed and Sealed this

Twenty-fifth Day of January, 2005

JON W. DUDAS
*Director of the United States Patent and Trademark Office*